United States Patent

Brown

[15] 3,699,432
[45] Oct. 17, 1972

[54] ELECTRICAL SHOCK HAZARD DETECTION SYSTEM WITH STATION SCANNING AND INDICATING MEANS

[72] Inventor: Verne R. Brown, Ann Arbor, Mich.
[73] Assignee: Environment Metrology Corporation, Ann Arbor, Mich.
[22] Filed: June 25, 1970
[21] Appl. No.: 49,654

[52] U.S. Cl. .....................324/51, 324/133, 328/152
[51] Int. Cl. ..............................................G01r 31/02
[58] Field of Search ....324/1, 51, 133, 140; 340/248, 340/147; 179/15 AC; 328/152

[56] References Cited

UNITED STATES PATENTS

| | | | |
|---|---|---|---|
| 3,436,751 | 4/1969 | Hron et al. | 340/248 |
| 3,248,650 | 4/1966 | Bialkowski et al. | 324/140 X |
| 2,870,259 | 1/1959 | Norris | 179/15 AC |
| 3,406,359 | 10/1968 | Welz et al. | 324/1 |
| 3,215,984 | 11/1965 | Abramson et al. | 340/147 |
| 3,182,253 | 5/1965 | Dorsch et al. | 324/51 |
| 3,514,694 | 5/1970 | Beachley | 324/51 |
| 3,243,705 | 3/1966 | Chenoweth | 324/140 R X |
| 3,256,492 | 6/1966 | Gilchrist | 328/152 X |
| 3,287,509 | 11/1966 | Bohnenblust | 324/66 X |
| 3,602,826 | 8/1971 | List | 328/152 X |

Primary Examiner—Gerard R. Strecker
Attorney—McGlynn & Reising and Milton & Ethington

[57] ABSTRACT

A scanning shock hazard detector comprising a plurality of flexible leads connectable to devices to be monitored, switches connecting the leads to a threshold detector, a plurality of warning lamps and a clock system for sequentially and synchronously closing the switches and enabling the warning lamps so that a current potential on one of the leads causes a lighting of the lamp associated with that lead. The lamps remain lighted until manually extinguished. A remote loudspeaker is also activated by a warning condition. The loudspeaker is quieted at the same time the lamp is extinguished.

10 Claims, 2 Drawing Figures

PATENTED OCT 17 1972 3,699,432

INVENTOR.
Verne R. Brown
BY
Bernard, McKenna & Reising
ATTORNEYS

ELECTRICAL SHOCK HAZARD DETECTION SYSTEM WITH STATION SCANNING AND INDICATING MEANS

This invention relates to shock hazard detectors and particularly to a shock hazard detector which operates in a scanning fashion to monitor the current potential of a plurality of conductive objects or devices.

It is well known that improperly grounded electrical devices present leakage current or shock hazards such that a person who comes into contact with such a device may complete a path to ground through his body and thus experience a shock of electrical current. The danger of such hazards is significant enough in everyday domestic appliances such as drills and other power tools but can be multiplied to lethal proportions in the case of hospital areas and clinics where infirm persons may receive the leakage current shocks.

The opportunity for shock hazard in hospital and clinic areas is extrodinarily high since it is common to have at least several electrical devices such as probes, motors, transducers, pacemakers, radios, television sets and other devices in such areas. Any one of these devices may present an intolerable shock hazard to a patient due to improper grounding. The conductive housing of an oscilloscope, for example, may acquire an elevated current potential relative to ground such that when an attendant touches both the patient and the oscilloscope housing, a current path is established to ground through the attendant and the patient. Though the healthy attendant may suffer no significant injury, the patient may suffer trauma or death.

The prior art includes a shock hazard detector which employs a current potential threshold detector and a probe which can be carried around the room and placed on or against individual electrical devices to determine which, if any, of those devices presents a shock hazard. The user of such a monitor must, of course, confirm the accuracy and completeness of each test and ideally must perform such tests at regular and frequent intervals. Since improper grounding is often due to insulation breakdown, structural damage, and the like, it may occur at any time in the life of an individual device. Thus, the prior art test procedure and apparatus is at best a halfway measure and at worst may provide little or no warning of the imminent electrical hazard presented by an electrical or passive but conductive device.

The present invention provides a shock hazard detector which may be simultaneously and semi-permanently connected to each of a number of individual electrical devices to continuously and sequentially monitor the current potential of the individual devices such that all or substantially all potentially hazardous devices in the presence of a hospital patient, for example, are continuously and regularly checked. In brief, the objects of the invention are accomplished by means of a current potential responsive threshold detector, a plurality of low impedance and preferably flexible electrical leads which are connectable to the various devices to be monitored, and a switching type scanner which periodically sweeps or scans the various leads to individually connect those leads to the threshold detector. The present invention further includes signal means such as lamps for providing an indication of the current potential or shock hazard potential of each of the monitored electrical devices.

In a preferred embodiment of the invention a plurality of flexible low impedance leads are connectable by means of individual termination devices to a plurality of electrical devices to be monitored. Each of the leads is connected through a controlled switch such as a dry reed relay or semiconductor switch to a low ampere threshold detector, the output of which is connected through a plurality of gates to control devices for the lighting of lamps. A timing control arrangement including a clock is employed to synchronize the closing of the individual switches and the enabling of the individual lamp control means such that samples are taken and lamps are lighted individually with no time overlap and in response to the individual current comparison procedures. In the preferred embodiment a double indication mode is employed wherein the first mode is local and visual in character and the second mode is audio and may be either local or remotely located The invention, as well as the features and advantages thereof, may be best understood by reference to the following specification which describes a specific and illustrative embodiment of the invention and is to be taken with the accompanying drawings of which:

Figure 1:
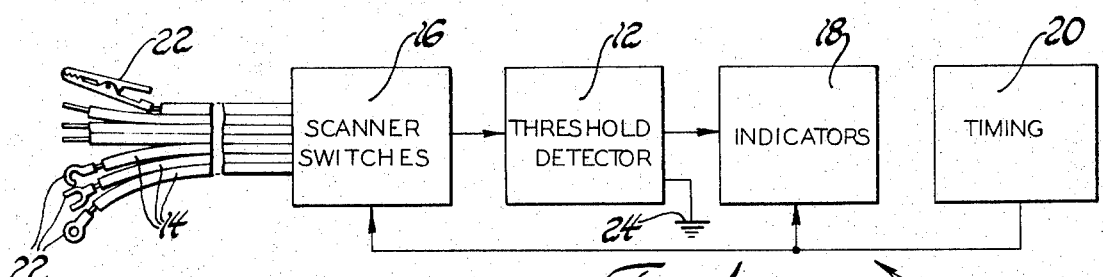
FIG. 1 is a general block diagram of the illustrative embodiment.

Referring to FIG. 1, the shock hazard detector 10 is shown to comprise an electrical current potential threshold detector 12 for receiving and responding to leakage current potentials in excess of at least one predetermined threshold in the microampere range. Shock hazard detector 10 further includes a plurality of flat ribbon multi-strand low impedance copper leads 14 which are adapted for individual connection to a plurality of active electrical or passive conductive devices of the type which may be found in a typical hospital or clinic. These devices include electrical instruments, such as oscilloscopes, probes, motors, monitoring electrodes, transducers, bed lamps, television sets, radios, and miscellaneous appliances, as well as passive conductive bodies such as metal window and bed frames. Shock hazard detector 10 further includes scanning means 16 in the form of a plurality of switches for individually connecting the leads 14 to the threshold detector 12. The output of threshold detector 12 is connected to signal means 18 in the form of a plurality of indicators which are operated by the threshold detector 12 in response to the receipt by detector 12 of a current potential in excess of the preestablished threshold. The operation of scanner switches 16 and the indicators 18 is synchronized by means of a timing control unit 20 which includes a digital clock of a type to be described.

Referring again to FIG. 1, the leads 14 are provided with termination devices 22 such as loops, forks, semicircles and alligator clips for semi-permanent connection to the individual electrical or conductive devices to be monitored. Alternatively, one or more of the leads 14 may be left unterminated such that the copper strands thereof may be conductively connected to the devices to be monitored by some other fashion. Leads 14 are preferably long enough and flexible enough to reach from a central location to all of the monitored devices in a given area such as a small hospital room. Lengths of eight to twelve feet are satisfactory. Obviously, more or fewer leads 14 may be employed and the number illustrated is not to be construed in a limiting sense. Threshold detector 12 is provided with a ground lead 24 which is preferably connected to a reliable ground reference such as a water pipe. The ground potential on lead 24 thus serves as a reference from which the current potentials applied to the threshold detector 12 by way of the leads 14 and the switches 16 may be compared.

Figure 2:
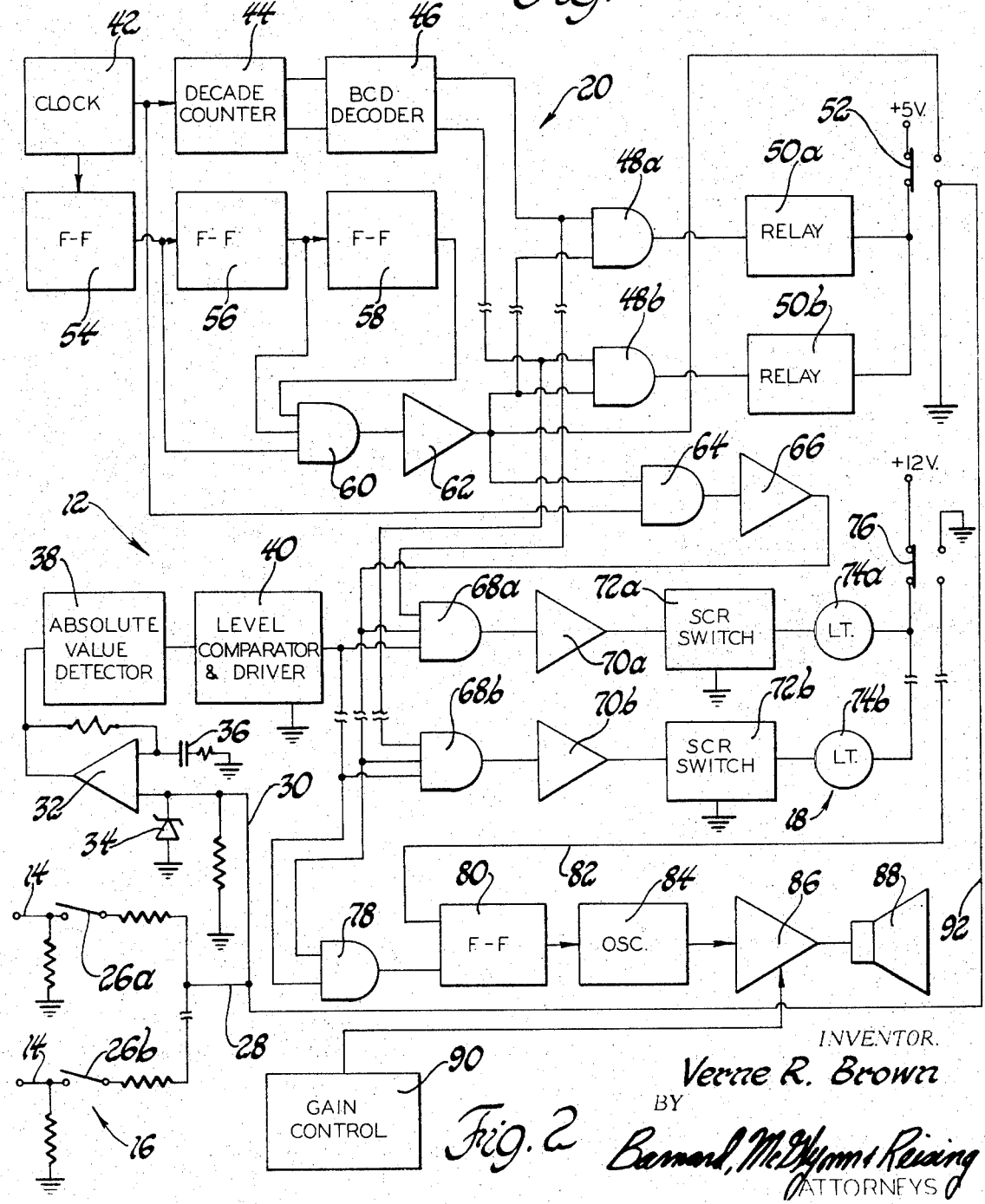
FIG. 2 is a detailed block diagram of the illustrative embodiment.

Referring now to FIG. 2, the system 10 of FIG. 1 is shown in greater detail and areas of the detailed block diagram of FIG. 2 which correspond to the blocks of FIG. 1 are identified with like reference numerals. The system of FIG. 2 shows only two leads 14, it being understood that more are usually employed in an actual system.

In FIG. 2 the leads 14 are shown to be connected through the scanner switches 16 which comprise individual switches 26a and 26b. The switches 26 may be of the dry reed type which can be electromagnetically closed by means of a switch control arrangement to be described. All of the normally open relay switches 26 are connected to a common conductor 28 which in turn is electrically connected to a conductor 30 which applies the signals received by the switches 26 to an input of operational amplifier 32. A Zener diode 34 provides overload protection for the operational amplifier 32 and is connected between the conductor 30 and ground as shown. The feedback or second input of the operational amplifier 32 is connected to ground through a capacitor 36 to provide a high frequency response characteristic. The output of operational amplifier 32 is connected to an absolute value detector 38 in the form of an inverter and thence to a level comparator and driver circuit 40 which is grounded by way of lead 24 as shown. The level comparator and driver circuit 40 is a solid state, single stage amplitude detector such as a dc biased transistor amplifier circuit. Circuit 40 is responsive to current in excess of a predetermined threshold to provide an output signal which is applied to the signal means 18 in a manner to be described.

Timing control unit 20 which operates to close the switches 26 individually and in sequence includes stable clock 42, the output of which is connected to a decade counter 44. The decimalized output of the decade counter 44 is in turn connected to a binary coded decimal decoder unit 46 which provides suitably coded output signals to a plurality of logic AND gates 48a and 48b which are in turn connected to operate switch control relays 50a and 50b, respectively. Relays 50a and 50b are operatively linked with switches 26a and 26b, respectively, to control the state of those switches when the relays conduct. The relays 50a and 50b are connected to a power supply by means of a normally closed pushbutton switch 52 as shown.

The output of clock 42 is also connected through a cascaded series of flip-flops 54, 56 and 58, the outputs of which are commonly connected to the input of AND gate 60. The output of gate 60 is connected through an amplifier 62 to one input of a second AND gate 64. The other input of AND gate 64 is received directly from clock 42. The output of gate 64 is connected through an amplifier 66 to one input of each of a plurality of driver signal responsive gates 68a and 68b. A second input to each of the gates 68 is received from the level comparator and driver circuit 40. A third input to each of the gates 68 is received from the binary coded decimal decoder 46 such that gates 48a and 68a, for example, receive signals from decoder 46 simultaneously. It is helpful to think of these as "clock" signals. The output of the gate 68a and 68b are individually connected through respective amplifiers 70a and 70b and thence to trigger circuits 72a and 72b. The trigger circuits 72 are SCRs which are subject to rapid turnon by means of trigger pulses which are received from the amplifiers 70. Switches 72a and 72b are individually connected to respective 12 volt incandescent lamps 74a and 74b which are in turn are connected to a suitable 12 volt power supply through a normally closed pushbutton switch 76.

The output of amplifier 66, as well as the output of level comparator and driver circuit 40, are connected to respective inputs of a gate 78, the output of which is connected to one input of a flip-flop 80. The other input to flip-flop 80 is received over a conductor 82 which is connected through the pushbutton switch 76 to ground for the purpose of clearing the flip-flop 80 upon operation of pushbutton switch 76. The "high" output of flip-flop 80 is connected to a gated oscillator 84 which in turn is connected through a power amplifier 86 to a loudspeaker 88. Power amplifier 86 is provided with a gain control unit 90 for volume control. Finally, a test line 92 is connected through the pushbutton switch 52 to a test power supply terminal and thence to the common conductor 28 of the switches 26 so that the operation of the scanning switches can be simultaneously tested simply by depression of pushbutton switch 52.

OPERATION

The operation of the system of FIG. 2 will now be described in detail. Leads 14 are connected by way of the terminal devices 22 to the various electrical devices and conductive bodies which are to be monitored. Clock 42 is started to begin the operation of the decade counter 44 and the binary coded decimal decoder 46 thus to sequentially progress through the energization of gates 48 and switch closing relays 50. Switches 26 are thus closed in sequence beginning with switch 26a and progressing individually to the lowermost switch 26b.

It is important that each switch be closed and reopened before the next switch is closed. This is accomplished by the flip-flops 54, 56 and 58 and the logical gates 60 and 48 for closing switches 26. The input to each gate 48 from decoder 46 is a clock signal and the input from amplifier 62 is a strobe signal which limits the actual sample time to the central portion of the clock time. Delay devices other than flip-flops may be employed for this purpose.

As switches 26 are closed in sequence the current potentials of the monitored devices are connected via the leads 14, the switches 26, and the conductors 28 and 30 to one input of the operational amplifier 32. The output of amplifier 32 is connected through the absolute value inverter circuit 38 to the level comparator 40 where a signal is generated only if the received input signal is in excess of a predetermined microampere value. If no output is produced by circuit 40 none of the gates 68 receives a coincidence of three input signals and thus none of the amplifiers 70 is energized to close one of the SCR switches 72. Accordingly, none of the lights 74 is illuminated. At the same time gate 78 does not receive a coincidence of two signals at the input thereof and thus flip-flop 80 remains in the low stage and no signal is produced by the combination of the gated oscillator 84 and the loudspeaker 88.

On the other hand, one of the terminal devices 22 may be connected to an electrical or conductive device which has developed a current potential. Should this occur, a signal is passed by way of a lead 14, conductor 28, and conductor 30 to the amplifier 32 during the clock time the switch 26 associated with the current-carrying lead is closed. During this clock time, level comparator and driver circuit 40 becomes conductive to produce an output signal which is applied commonly to all of the gates 68.

As previously indicated, gates 68 become conductive only when all three inputs are active. Decoder 46 applies signals sequentially to gates 68, as well as gates 48. Thus, relays 50 close switches 26 in a sequence related to the sequence in which input signals are applied to gates 68. Accordingly, the gates 68 are correlated to the leads 14 such that during the strobe pulse from amplifier 62 the gate 68 which becomes conductive is identified with the lead 14 to which a current potential is applied.

The conductive gate 68 passes a signal to its associated amplifier 70 which, in turn, triggers the gate electrode of its associated SCR switch 72. When the SCR switch 72 becomes conductive, current flows from the dc source indicated through switch 76 to the lamp 74 connected in series with the primary electrodes of that SCR. The lamps 74 are preferably arranged on a readout panel bearing identification tags which indicate the monitored body or device. The SCR switch 72 remains conductive to maintain the illumination of the associated lamp 74 until current flow through the SCR switch 72 is interrupted by opening switch 76. Accordingly, the visual warning is persistent until observed by an attendant.

When the level comparator and driver circuit 40 produces an output signal to the gate 68 associated with the switch 26 which is closed, this signal appears at the input of gate 78 coincidentally with an output signal from amplifier 6. Accordingly, the flip-flop 80 is toggled to the high state, thus, actuating the oscillator 84 and the power amplifier 86. This produces an audio signal by way of loudspeaker 88 which might be located on the scanner or alternately be connected so as to be heard in a remote point such as the nurse's station. Operating the pushbutton switch 76 terminate the illumination of the lamp 74 also clears the flip-flop 80, thus, terminating the operation of the oscillator 84, amplifier 86, and loudspeaker 88.

It is to be understood that two or more levels of threshold detection may be employed to indicate incipient hazardous conditions and such addition to the system of FIG. 2 involves merely an expansion of circuit 40 and the arrangement of gates 68, amplifier 70 and switches 72 as well as lamps 18. Various other additions and modifications to the specific arrangement shown in FIG. 2 will be apparent to those of ordinary skill in the art and the foregoing specification is not to be construed in a limiting sense.

The embodiments of the invention in which an exclusive property or privilege is claimed are defined as follows:

1. A shock hazard detector for sensing electrical current potentials in each of a plurality of monitored conductive objects comprising: electrical current potential detector means for detecting current potentials exceeding a first predetermined threshold and producing an output signal when such an excess potential is detected, a plurality of low impedance electrical leads for connection to said objects, scanning means actuable for sequentially and individually connecting the leads to the detector means, said scanning means including a plurality of logic means equal in number to the plurality of electrical leads and each being responsive to coincidental clock and strobe signals to produce outputs for actuation of said scanning means, signal means including a plurality of indicators equal in number to the plurality of electrical leads, first coincidence controlled switching means connecting each of said indicators to the detector means for energization thereof by said output signal in response to a current potential in excess of the first threshold, and timing means including first means for producing clock signals defining signal sampling intervals and second means for producing strobe signals defining signal transfer times within said sampling intervals, said clock and strobe signals being operatively connected with the logic means of said scanning means for synchronously advancing the scanning means thereby to connect said leads to said detector means for signal transfer in successive, time-spaced signal transfer times, said clock and strobe signals also being operatively connected with the coincidence controlled switching means for sequentially enabling the plurality of indicators whereby an indicator corresponding to a given one of said objects is energized only when the potential thereof exceeds said threshold.

2. A shock hazard detector as defined in claim 1 wherein the signal means includes an alarm, second coincidence controlled switching means operatively connecting the detector means to the alarm, said timing means being connected to said switching means whereby the alarm is energized when the potential of any of said objects exceeds said threshold.

3. A shock hazard detector as defined in claim 1 wherein the indicators each comprise a light and the alarm comprises an audio signal generator.

4. A shock hazard detector as defined in claim 1 wherein the scanning means comprises a plurality of controlled switches individually connecting the electrical leads to the detector means, said timing means being connected to the switches for sequentially closing the switches.

5. A shock hazard detector as defined in claim 1 wherein the electrical leads are flexible ribbons having insulative coatings.

6. A shock hazard detector as defined in claim 5 wherein each of the flexible ribbons has a terminal device on the free end thereof.

7. A shock hazard detector as defined in claim 4 wherein the detector means includes comparator means having first and second inputs and an output for producing a signal proportional to the difference between the potentials applied to the inputs, one input being commonly connected to the plurality of switches and the other input being grounded.

8. A shock hazard detector as defined in claim 1 wherein the signal means remains in operation in response to said current potential, the detector further including reset means to manually terminate operation of the signal means.

9. A shock hazard detector as defined in claim 8 wherein the indicators and the alarm are simultaneously affected both by the detector means and the reset means.

10. A shock hazard detector as defined in claim 9 wherein the signal means includes at least one SCR switch controlling the indicator.

* * * * *